United States Patent
Dey

(10) Patent No.: US 9,617,049 B2
(45) Date of Patent: Apr. 11, 2017

(54) METAL CLOSURE HAVING AN OXYGEN SCAVENGING INTERIOR SURFACE

(71) Applicant: Sonoco Development, Inc., Hartsville, SC (US)

(72) Inventor: Subir K. Dey, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 400 days.

(21) Appl. No.: 14/366,890

(22) PCT Filed: Dec. 26, 2012

(86) PCT No.: PCT/US2012/071658
§ 371 (c)(1),
(2) Date: Jun. 19, 2014

(87) PCT Pub. No.: WO2013/103566
PCT Pub. Date: Jul. 11, 2013

(65) Prior Publication Data
US 2014/0360895 A1 Dec. 11, 2014

Related U.S. Application Data

(60) Provisional application No. 61/582,655, filed on Jan. 3, 2012.

(51) Int. Cl.
*B65D 51/24* (2006.01)
*B32B 15/08* (2006.01)
(Continued)

(52) U.S. Cl.
CPC ............ *B65D 51/244* (2013.01); *B32B 15/06* (2013.01); *B32B 15/08* (2013.01); *B32B 25/16* (2013.01); *B32B 27/34* (2013.01); *B65D 7/42* (2013.01); *B65D 17/163* (2013.01); *B65D 81/266* (2013.01); *B32B 2307/74* (2013.01);
(Continued)

(58) Field of Classification Search
CPC .. B65D 51/244; B65D 17/163; B65D 81/266; B65D 2517/0016; B65D 2517/0062; B65D 7/42; B32B 15/08; B32B 15/06; B32B 25/16; B32B 27/34; B32B 2307/74; B32B 2439/40
See application file for complete search history.

(56) References Cited

U.S. PATENT DOCUMENTS 3,726,106 A 4/1973 Jaeger
4,279,350 A 7/1981 King
(Continued)

FOREIGN PATENT DOCUMENTS

EP 2397419 A1 12/2011

OTHER PUBLICATIONS

International Search Report and Written Opinion for related International Application No. PCT/US12/71658; report dated Apr. 16, 2013.

*Primary Examiner* — Michael C Miggins
(74) *Attorney, Agent, or Firm* — Miller, Matthias & Hull LLP

(57) ABSTRACT

An improved container for use in holding oxygen sensitive contents is provided. The container comprises a body having an open end sealed with a metal closure. The metal closure includes a metal structural layer, a polymeric interior coating layer and an oxygen scavenger layer interposed between the metal structural layer and the polymeric interior coating layer.

11 Claims, 2 Drawing Sheets

(51) Int. Cl.
    *B32B 15/06*     (2006.01)
    *B32B 25/16*     (2006.01)
    *B32B 27/34*     (2006.01)
    *B65D 17/00*     (2006.01)
    *B65D 81/26*     (2006.01)
    *B65D 6/00*     (2006.01)

(52) U.S. Cl.
    CPC .. *B32B 2439/40* (2013.01); *B65D 2517/0016* (2013.01); *B65D 2517/0062* (2013.01)

(56) References Cited

U.S. PATENT DOCUMENTS

| | | |
|---|---|---|
| 5,143,763 A | 9/1992 | Yamada et al. |
| 5,605,996 A | 2/1997 | Chuu et al. |
| 6,007,885 A | 12/1999 | Hallock |
| 6,461,699 B1 | 10/2002 | Slat et al. |
| 7,137,524 B2 | 11/2006 | Nomula |
| 7,364,779 B2 | 4/2008 | Nomula |
| 7,727,605 B2 | 6/2010 | Darr et al. |
| 7,854,973 B2 | 12/2010 | Dey |
| 7,927,678 B2 | 4/2011 | Mitadera et al. |
| 7,954,305 B2 | 6/2011 | Dey |
| 7,964,258 B2 | 6/2011 | Hale et al. |
| 2007/0045321 A1 | 3/2007 | Fox et al. |
| 2007/0187352 A1 | 8/2007 | Kras et al. |
| 2008/0035600 A1 | 2/2008 | McGeough et al. |
| 2008/0044603 A1 | 2/2008 | Hutchinson et al. |

# METAL CLOSURE HAVING AN OXYGEN SCAVENGING INTERIOR SURFACE

CROSS-REFERENCE TO RELATED APPLICATIONS

This application is a 35 USC §371 U.S. national stage filing of International Patent Application No. PCT/US2012/071658 filed on Dec. 26, 2012, which claims priority under 35 USC §119(e) to U.S. Provisional Ser. No. 61/582,655, filed on Jan. 3, 2012.

BACKGROUND OF THE INVENTION

Field of the Invention

This invention patent relates to a closure for food containers. More particularly, this invention relates to a metal closure having an oxygen scavenging interior surface for use in sealing a food container such as a transparent plastic can.

Description of the Related Art

With increases in the price of metal, plastic cans have become price competitive with two piece metal cans. Other benefits of plastic cans include the potential to view the can contents through the can body, the elimination of bisphenol A (BPA) (a component in the epoxy resin used to coat the insides of many food and beverage metal cans), and positive consumer perceptions regarding freshness and taste.

High Barrier Plastic Cans

High barrier, multilayer plastic cans fall into two basic types: those having tubular extruded bodies requiring two closures or ends, and those having thermoformed or blow molded bodies requiring a single end. Either type can suffer from two negative issues: headspace oxygen and retort shock.

Headspace Oxygen

"Headspace" refers to the space in a can or container not occupied by product. Generally due to handling issues, the headspace in a typical can may be as high as 0.5% of the can volume. The air in the headspace or, more specifically, the oxygen in the air, can reduce product shelf life. Solutions to this problem include flushing the headspace with an inert gas such as nitrogen and using a chemical absorbent to absorb the oxygen.

Retort Shock

Ethylene-vinyl alcohol copolymer (EVOH) is the most common oxygen barrier plastic material used in the production of plastic barrier containers. Unfortunately, the oxygen barrier property of EVOH decreases as the barrier layer absorbs water, which occurs during hot retort processing. Oxygen from the ambient air can pass through the barrier layer during the drying stage, a phenomenon referred to as "retort shock."

Possible solutions to retort shock include using a desiccant (drying agent) in the can body, and/or using an oxygen scavenger in the can body.

Oxygen Scavengers

Oxygen scavengers come in two types: those that do not require an activator (and so begin working as soon as the bottle or can manufacturing process is finished) and those that require an activator (such as ultraviolet (UV) light or moisture). Oxygen scavengers requiring UV light activation are not popular because they require an extra processing step. Oxygen scavengers activated by moisture are generally regarded as safe (GRAS) for use in food containers, but sometimes can cause opaqueness, an undesirable property when a clear or transparent container is desired.

The Prior Art

Various references describe ways to address the problems of headspace oxygen, retort shock or both. The majority of these references disclose the use of oxygen scavengers in a plastic container body wall. However, it has been discovered that adding an oxygen scavenger solely to the interior side of the metal end of a plastic container can effectively address the problem of headspace oxygen and possibly also retort shock.

It is therefore an object of the present invention to provide a way to use an oxygen scavenger in a plastic container without compromising the clarity of the plastic container body.

Another object of the present invention is to provide a metal end or closure having an oxygen scavenging interior surface for use with a clear or transparent plastic container body.

Further and additional objects will appear from the description, accompanying drawings, and appended claims.

BRIEF SUMMARY OF THE INVENTION

The present invention fulfills these objectives by providing a plastic can with an oxygen scavenging chemical added to the metal end in such a way that does not cause opaqueness in the clear or transparent plastic can body.

According to a first embodiment of the invention, an oxygen scavenger is added to the interior side of the metal end. The can body may be plastic, metal or composite. For a plastic can, the oxygen scavenger can be added to the metal end as a separate layer between the metal structural layer and the interior polymeric coating normally found on the interior side of the metal end.

Alternatively, the oxygen scavenger can be added to the polymeric coating layer. Where the oxygen scavenger is added to the polymeric coating layer, a second, separate polymeric coating layer may be applied on the interior facing side of the oxygen scavenger/polymeric coating layer to isolate the oxygen scavenger from the packaged product and to improve the bonding between the metal end and the plastic body.

DETAILED DESCRIPTION OF THE INVENTION

Figure 1:
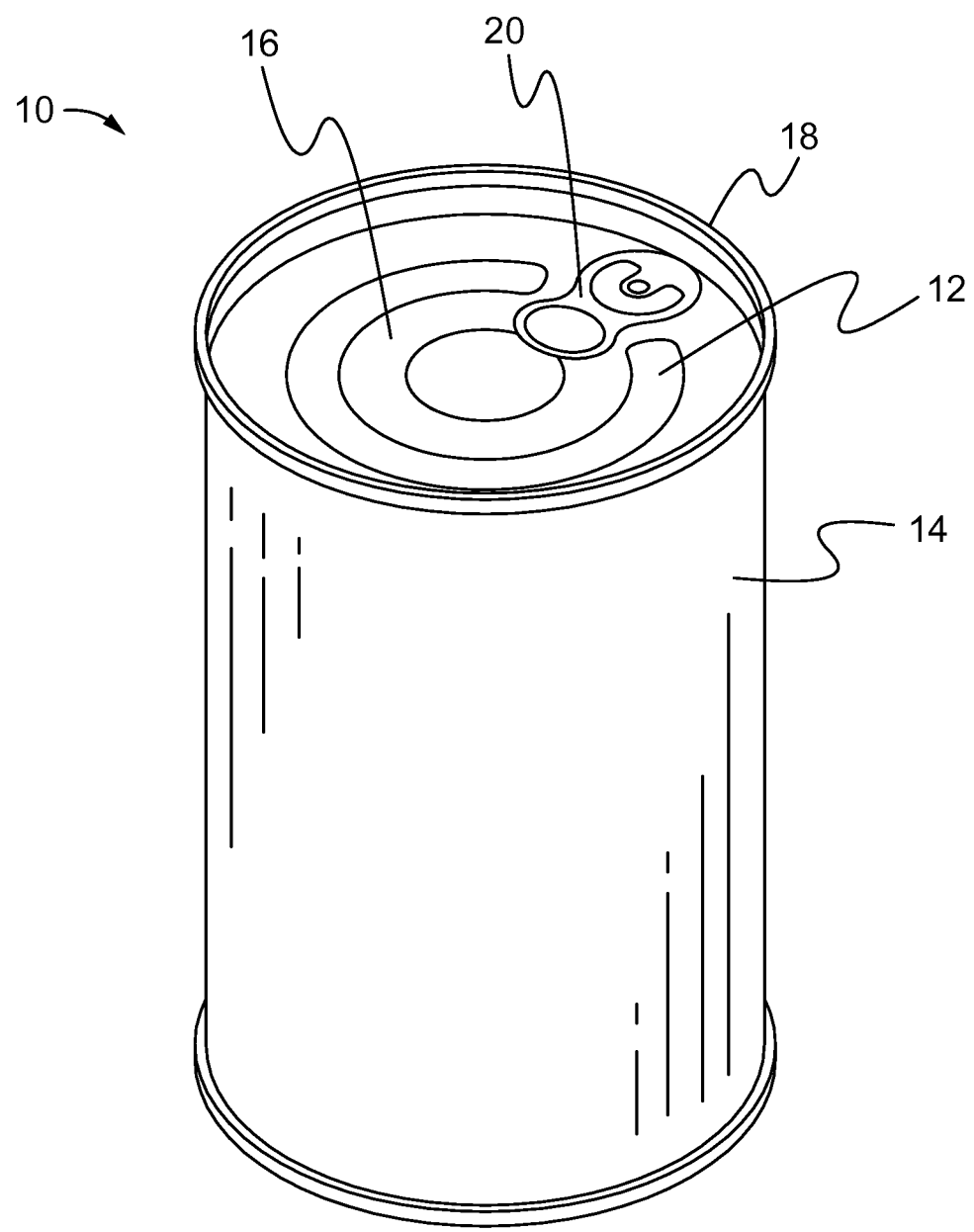
FIG. 1 is a perspective view of a container according to the invention.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

The Invention

Turning to the drawings, there is shown in FIG. 1 one embodiment of the present invention, a plastic can or container 10 having an oxygen scavenging chemical added to the metal end 12 in such a way that does not cause opaqueness in the clear or transparent plastic container body 14.

The Container

The body 14 may one of two basic types: a tubular extruded body requiring two closures or ends, or a thermoformed or blow molded body requiring a single end. The body 14 shown in FIG. 1 is a thermoformed or blow molded body requiring a single metal end 12. Where the body is an extruded tube, the second end opposite the open end may be sealed with a non-oxygen scavenging closure or other suitable closure.

The container body 14 may be plastic, metal or composite. The body 14 may be opaque, although the invention is most useful where the body 14 is transparent plastic. Operable plastics include polypropylene (PP) and polyethylene terephthalate (PET).

The Metal End

Figure 2:
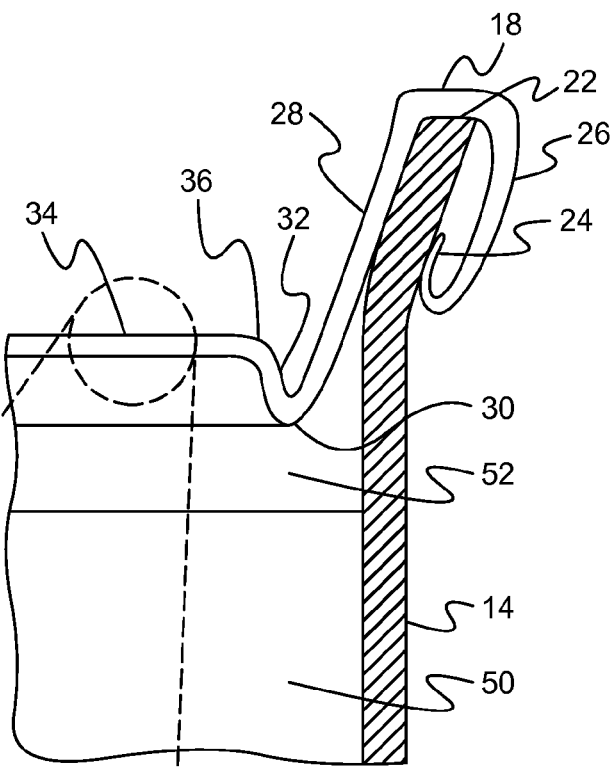
FIG. 2 is a cross-sectional view of the container of FIG. 1 taken along 2-2.

As shown in FIG. 1 the metal end 12 may be of the easy opening type comprising a covering portion 16, an annular rim 18 and a pull tab 20. As shown in FIG. 2, when fitted onto the container body 14 and sealed thereto, the annular rim 18 forms a friction fit with the top rim 22 of the container body 14. The end 12 further comprises an outer skirt or flange 26 that extends downward from the annular rim 18 adjacent the outer surface of the container body 14, an annular chuck wall 28 that extends downward from the annular rim 18 adjacent the inner surface of the container body 14, and a container covering portion 28. The outer skirt 26 may terminate in an upwardly curled extremity 24 suitable for either a crimp seam or double seam. The covering portion 16 comprises an annular peripheral area 30 at the base of the chuck wall 28, a sidewall 32 that extends upwardly from the annular peripheral area 30, and a raised circular central panel 34 terminating in a periphery 36 coextensive with the sidewall 32. The central panel 36 is raised above the annular peripheral area 30 but below the plane defined by the container rim 22.

As best shown in FIG. 2, the end 12 is countersunk with respect to the container top rim 22. The countersink portion is made up of the chuck wall 28, the annular peripheral area 30, the sidewall 32 and the raised central panel 34, all of which extend below the container top rim 22. The countersink portion and raised central panel 34 help absorb compression forces during handling.

The packaged product 50 does not occupy the entire interior space of the container 10, leaving a headspace 52 between the packaged product and the metal end 12.

The end or closure 12 is made of metal with a coated or laminated interior surface. The metal end 12 may be bonded to the can body 14 by conventional crimp sealing (as shown in FIG. 2), double seaming, or any suitable method. For a plastic can body, the bond between the can body 14 and the metal end 12 may be enhanced by selective heating of the seaming area.

The Oxygen Scavenger Layer

According to a first embodiment of the invention an oxygen scavenger is added to the interior side of the metal end 12. For a plastic container 10, the oxygen scavenger preferably is added to the metal end 12 as a separate layer between the metal structural layer and the interior polymeric coating normally found on the interior side of the metal end 12. In other words, the oxygen scavenger is contained in an intermediate layer 46 interposed between the metal structural layer 42 and the polymeric interior coating layer 48.

Figure 3:
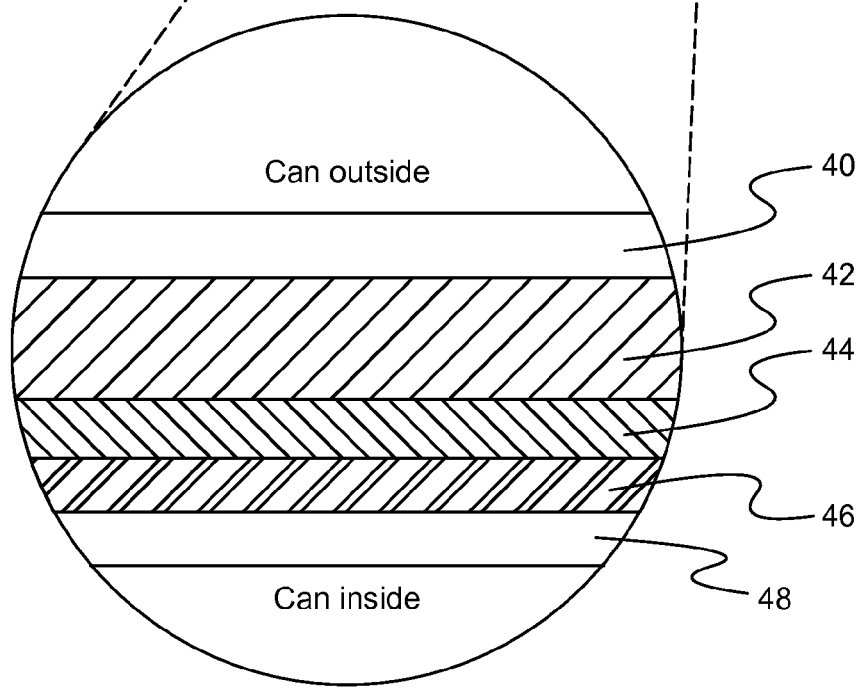
FIG. 3 is an enlarged view of a portion of the container of FIG. 2 showing the metal end in more detail.

For example, in the embodiment shown in FIG. 3 the metal end 12 comprises the following layers, beginning with the top, exterior facing, layer: a polymeric exterior coating 40, a metal structural layer 42, a primer layer 44, an oxygen scavenger layer 46 and a polymeric interior coating 48. The polymeric interior coating 48 helps to isolate the oxygen scavenger from the packaged product 50 and to improve the bonding between the metal end 12 and the plastic body 14.

The oxygen scavenger 46 should be compatible with the polymeric interior coating 48. For example, if the can body 14 is made of polypropylene, the polymeric interior coating 48 of the metal end 12 should be polypropylene or another polymer capable of bonding to polypropylene when heat is applied, and the oxygen scavenger 46 should be compatible with polypropylene. For a PET plastic body, the polymeric interior coating 48 of the metal end 12 should be polyester capable of bonding to PET and the oxygen scavenger 46 should be compatible with polyester.

The oxygen scavenger 46/polymeric interior coating 48 may include:

(a) A blend of transition metal catalyst and polymeric interior coating containing unsaturated double or triple bonds in the polymer backbone, such as butadiene.

(b) A polymer or polymer blend that can create an unsaturation when exposed to light, heat or electromagnetic energy.

(c) Any nylon based scavenger.

(d) A blend of transition metal catalysts and chemical and/or polymer that can generate hydrogen and/or unsaturated low molecular weight hydrocarbon in the presence of water.

(e) A transition metal oxide capable of absorbing oxygen, such as catalyzed ferrous oxide.

Alternative Embodiment

Alternatively, the oxygen scavenger can be added to the polymeric interior coating layer. Where the oxygen scavenger is added to the polymeric interior coating layer, a second, separate polymeric coating layer may be applied on the interior facing side of the oxygen scavenger/polymeric coating layer to isolate the oxygen scavenger from the packaged product and to improve the bonding between the metal end and the plastic body.

* * *

Thus there has been described a metal closure having an oxygen scavenging interior surface for use in sealing a food container such as a transparent plastic can. The closure includes a metal structural layer, a polymeric interior coating layer and an oxygen scavenger layer interposed between the metal structural layer and the polymeric interior coating layer. The oxygen scavenger may be activated by moisture contained in the packaged product to absorb oxygen from the container headspace and oxygen that has entered the container during retorting.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

I claim as my invention:

1. An improved container for use in holding oxygen sensitive contents, the container comprising a body having an open end and a metal closure for sealing the open end, the metal closure comprising a metal structural layer having an interior side and a water permeable polymeric interior coating layer disposed on the interior side, wherein the improvement comprises:

a water activated oxygen scavenger disposed on the interior side of the metal closure.

2. The container of claim 1 wherein the oxygen scavenger is contained in an intermediate layer interposed between the metal structural layer and the polymeric coating layer.

3. The container of claim 2 wherein the body is transparent and formed from plastic.

4. The container of claim 2 wherein the oxygen scavenger is a transition metal catalyst and the polymeric interior coating layer comprises a polymer having unsaturated double or triple bonds.

5. The container of claim 4 wherein the polymer is butadiene.

6. The container of claim 2 wherein the oxygen scavenger is nylon based.

7. The container of claim 2 wherein the oxygen scavenger is a blend of transition metal catalysts and chemicals that can generate unsaturated low molecular weight hydrocarbons in the presence of water.

8. An improved container for use in holding oxygen sensitive contents, the container comprising a body having an open end and a metal closure for sealing the open end, the metal closure comprising a metal structural layer having an interior side and a polymeric interior coating layer disposed on the interior side, wherein the improvement comprises:
   an oxygen scavenger contained in an intermediate layer interposed between the metal structural layer and the polymeric interior coating layer;
   wherein the oxygen scavenger is a transition metal oxide capable of absorbing oxygen.

9. The container of claim 8 wherein the transition metal oxide is ferrous oxide.

10. An improved container for use in holding oxygen sensitive contents, the container comprising a body having an open end and a metal closure for sealing the open end, the metal closure comprising a metal structural layer having an interior side and a polymeric interior coating layer disposed on the interior side, wherein the improvement comprises:
   an oxygen scavenger disposed on the interior side of the metal closure; wherein
   the body is an extruded tube having a second end opposite the open end, the second end sealed with a non-oxygen scavenging metal closure.

11. A metal closure for sealing an open end of a container, the container having an interior and comprising a body wall, the metal closure comprising:
   a metal structural layer having an interior side that faces the container interior;
   a water activated oxygen scavenger layer disposed on the interior side of the metal structural layer;
   a separate water permeable polymeric coating layer disposed on a side of the oxygen scavenger layer away from the metal structural layer; and
   a primer layer disposed between the metal structural layer and the oxygen scavenger.

* * * * *